Patented Aug. 14, 1951

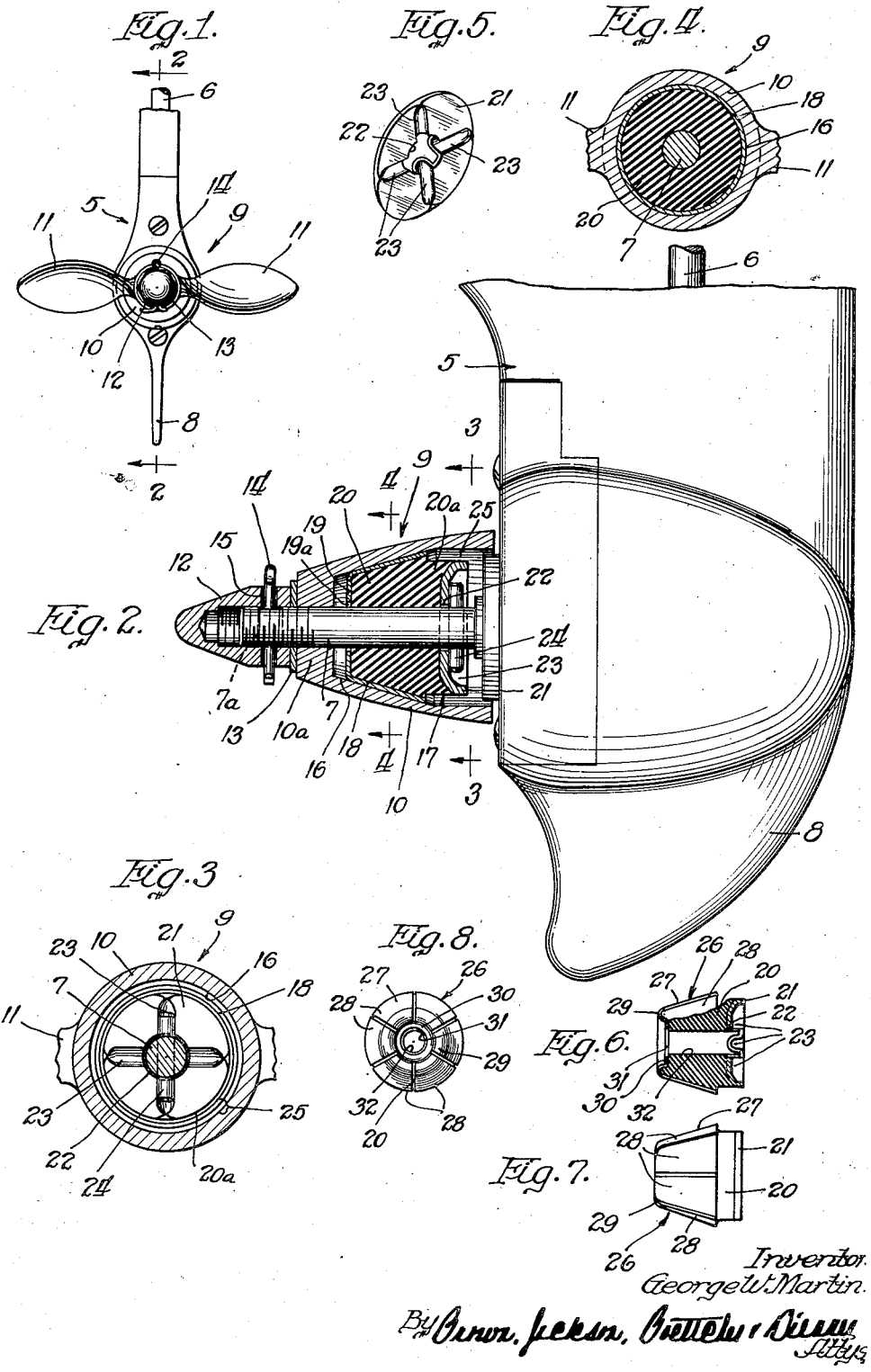

2,564,605

UNITED STATES PATENT OFFICE 2,564,605

PROPELLER CLUTCH

George W. Martin, Eau Claire, Wis.

Application July 13, 1945, Serial No. 604,822

10 Claims. (Cl. 64—30)

This invention relates to boat propellers, and has to do with clutch means for establishing driving connection between the propeller and its associated shaft.

In propeller driven boats, including boats having inboard motors and boats having outboard motors, particularly when such boats are operated in shallow water or water in which submerged objects may be present, there is the possibility that the propeller may strike a submerged object causing damage to the propeller or to some portion of the driving mechanism, or to both. In order to reduce that risk, it is known to provide a shear pin at a suitable point in the propeller drive, of such character that if the propeller strikes an unyielding object the pin will shear before damage is caused to the propeller or the associated mechanism. In some cases a resilient cushion member is inserted in the propeller drive for the purpose of absorbing shock when the propeller strikes an unyielding object to thereby further protect the propeller mechanism. Also, friction drives have been included in the propeller mechanism to allow slippage upon occurrence of abnormal resistance to rotation of the propeller. It has further been proposed to provide a toothed member of rubber or like material in the propeller drive, the projections or teeth of the rubber member engaging with corresponding teeth of the propeller hub. Upon occurrence of abnormal resistance to rotation of the propeller slippage occurs between the hub and the member formed of rubber or like material, the teeth of the latter member being deformed sufficiently to allow such slippage. In the latter arrangement the overload at which slippage occurs is not adjustable, and the rubber, being in constant contact with the metal, may vulcanize to it if the unit is not used for some time and is stored in a warm place. In general, the various arrangements above referred to have not proved to be reliable, and, in the case of a shear pin only being used, replacement of a sheared pin while out in a boat is difficult and may in some cases be dangerous.

My invention is directed to a propeller drive mechanism which avoids the objections to the known mechanisms above referred to, is compact, of simple and inexpensive construction, readily accessible for inspection, replacement or repair, and may be located entirely outside of the gear housing, when applied to outboard motors. The mechanism of my invention combines in one unit of simple construction a shear pin, a resilient member, and a friction clutch, the latter comprising cooperating clutch surfaces having metal to metal contact whereby possibility of the resilient member, formed of rubber or rubber-like material, becoming vulcanized to the metal hub of the propeller is eliminated. The unit is adjustable to permit slippage in response to predetermined abnormal resistance to rotation of the propeller, will quickly pickup the propeller when the abnormal resistance to rotation thereof is removed and, in the event slippage does not occur due to improper adjustment of the parts, will relieve the propeller mechanism of destructive strains by shearing of the shear pin or the resilience of the rubber, thus guarding the propeller mechanism against injury even though intended slippage of the clutch does not occur due to maladjustment or any other cause. Further objects and advantages of my invention will appear from the detail description.

In the drawings:

Figure 1 is a stern view of a gear housing and propeller unit embodying my invention, intended for use with an outboard motor;

Figure 2 is a sectional view of the propeller and the associated clutch means, taken substantially on line 2—2 of Figure 1, with certain parts shown in elevation and the gear housing shown in side view on an enlarged scale;

Figure 3 is a sectional view taken substantially on line 3—3 of Figure 2;

Figure 4 is a sectional view taken substantially on line 4—4 of Figure 2;

Figure 5 is an isometric detail view of the shear pin disc;

Figure 6 is an axial sectional view of a modified form of cone clutch unit, partly broken away;

Figure 7 is a side view of the unit of Figure 6; and

Figure 8 is an after end view of the unit of Figures 6 and 7.

I have shown the propeller clutch means of my invention, by way of example, as applied to a unit intended for use with an outboard motor. This unit comprises a gear housing 5, of suitable construction, intended for bolting to the lower end of a steering tube or column carrying at its upper end a suitable motor, as is known, which drives a shaft 6 extending downward into casing or housing 5 and having driving connection, through gearing within housing 5, to a propeller shaft 7 rotatably mounted within housing 5 and extending outward therebeyond. The housing 5 may also contain a water pump driven by the propeller shaft 7, is of generally cylindrical shape as to its main or body portion and is provided with a downwardly extending skeg 8. The particular construction of the gear housing 5 and the arrangement of the parts therein are not of the essence of my instant invention and need not be illustrated nor described in greater detail. Suffice it to state that, when my invention is applied to a unit intended for use with an outboard motor, the propeller shaft is rotatably mounted in a suitable gear housing intended to be secure, by bolting or in any other suitable manner, to the lower end of a steering tube or column, the gear housing receiving a shaft, such as the shaft 6, driven in a suitable manner and having suitable driving connection to the propeller shaft. It will be understood, however, that the propeller clutch means of my invention is not limited to use with a unit intended for use with an outboard motor, and may be applied to a propeller and its associated shaft driven from a motor or engine within the hull of the boat, in a suitable known manner.

A propeller 9, comprising a hub 10 and suitably formed and disposed blades 11 secured to the hub, conveniently formed integrally therewith, is mounted on the after portion of propeller shaft 7. The propeller 9 is restrained against movement lengthwise of shaft 7 aft by a cap nut 12 screwing on the after end of shaft 7 in contact with a washer 13 abutting the after end of hub 10, nut 12 being normally restrained against turning movement on shaft 7 by a cotter pin 14 passing through a diametrical slot 7a in shaft 7 and through diametrically opposite bores 15 in nut 12. Any other suitable means may be provided, within the field of my invention, for restraining nut 12 against turning movement relative to shaft 7.

The hub 10 of propeller 9 is of hollow construction for the major portion of its length, open at its forward end and is formed interiorly to provide a frusto-conical friction surface 16 extending forward from the relatively thick after portion 10a of hub 10 and flaring toward the forward open end thereof. The thickened portion 10a of hub 10 is provided with an axial bore of a size to receive shaft 7 snugly but not tightly.

The frusto-conical friction surface 16 of hub 10 cooperates with a clutch unit 17 comprising a metal friction clutch cone 18, conveniently formed as a sheet metal stamping, having an end wall 19 at its after end provided with a central opening 19a of somewhat greater diameter than propeller shaft 7. A resilient member 20, preferably in the form of a body of rubber or like elastic material and having a central opening snugly receiving shaft 7, is confined between the cone clutch member 18 and a metal plate or disk 21, preferably formed as a stamping, disposed about shaft 7 and having a central opening 22 of somewhat greater diameter than the shaft. The disk 21 is provided with one or more pairs of diametrically opposite depressions 23 extending outward from opening 22 and disposed to receive the end portions of a shear pin 24 inserted through propeller shaft 7 diametrically thereof. The pin 24 provides an abutment restraining disk 21 against forward movement along propeller shaft 7 while providing, in conjunction with the depressions 23, driving connection between the shaft 7 and disk 21.

Within the broader concept of my invention, the resilient member 20 may assume various forms other than that of a body of rubber or like material, and this member is suitably secured at its ends to the cone clutch member 18 and the disk 21 so as to provide driving connection therebetween. When the resilient member 20 is formed of a body of rubber or like material, as illustrated, it is of proper size and shape to fit snugly within the friction clutch cone 18, to which it is bonded or otherwise suitably secured, and to extend forward beyond clutch member 18, the forwardly extending portion 20a of member 20 being somewhat reduced and of substantially cylindrical shape to provide clearance 25 between such portion 20a and the inner surface of propeller hub 10. The body of rubber comprising the resilient member 20 is bonded or otherwise suitably secured to the disk 21, thereby providing driving connection from propeller shaft 7 to the cone clutch member 18, through shear pin 24 and disk 21 and the elastic body of member 20.

It will be seen that by turning the nut 12 onto the propeller shaft 7, the hub 10 of the propeller may be forced forward along shaft 7 so as to place the resilient member 20 under stress or compression lengthwise of the propeller shaft, so that the cone clutch member 18 is held in pressure contact with friction surface 16, under a pressure permitting slippage between surface 16 and cone clutch member 18 when the resistance to rotation of the propeller exceeds a value predetermined by the tightening of the nut. As will be understood, the adjustment is such that no slippage occurs under normal conditions and the propeller rotates with the clutch cone member 18, and, therefore, with the propeller shaft 7, under normal operating conditions, slippage being permitted when the propeller encounters abnormal resistance to its rotation, as when a blade of the propeller strikes an object offering substantial resistance to rotation thereof. Under such abnormal conditions, slippage between surface 16 and the cone clutch member 18 occurs, thereby avoiding damage to the propeller and to its associated driving mechanism. When the resilient member 20 is in the form of a body of rubber or rubber-like material, as is preferred, it also serves as a torque cushion member effective for cushioning shock due to sudden stoppage of the propeller or due to sudden acceleration in the speed of rotation thereof, further guarding against injury to the propeller and associated parts. It will be noted that the propeller clutch comprises friction clutch elements having metal to metal contact and that the rubber or like material of which the member 20 preferably is formed is not in rubbing contact with any metal part, whereby risk of the rubber or like material becoming vulcanized to a relatively movable metal part is avoided, thus eliminating possibility of the clutch being rendered inoperative or of reduced efficiency due to that cause.

It will be seen that in the preferred embodiment of my invention, the cone clutch member 18 and the disk 21 constitute with the member 20 a unit in which the member 20, formed of rubber or rubber like material, provides a yielding or cushioned driving connection between plate 21 and cone 18 which acts as a torque cushion when the propeller is started or is stopped, serving to guard the propeller and the associated mechanism against damage. Further, the body of rubber 20 is normally under endwise compression and exerts radial pressure against the surrounding wall of the cone clutch member 18 which may, therefore, be of comparatively light or thin metal. Under normal conditions, when the propeller encounters resistance to its rotation appreciably greater than the resistance offered by the water in which the propeller is immersed, as when a propeller blade strikes an object, slippage occurs, after the body of rubber 20 or like material has taken up the initial shock due to sudden stoppage of the propeller. In the event of improper adjustment, such as would not permit slippage between friction surface 16 and the cone clutch member 18 at a sufficiently low overload to preclude damage to the propeller or associated parts, the portions of the shear pin 24 extending beyond the propeller shaft 7 are sheared or broken off thus relieving the member 20 of endwise compression, by movement forwardly along shaft 7 of disk 21, and permitting rotation of shaft 7 independently of the propeller and of unit 17. When that occurs, by removing nut 12, the propeller 9 and the unit 17 may readily be removed from the propeller shaft 7, after which a new shear pin 24 may be inserted through that shaft and the parts replaced, care being taken to adjust the nut 12 so that the propeller will be driven under normal conditions while assuring that slippage of the propeller will occur when abnormal resistance to rotation thereof is encountered. It will be seen that the propeller clutch of my invention is of simple and compact construction, comprises few parts which may be produced at small cost, is disposed entirely outside of the gear housing 5, is housed within the hub of the propeller so as to be guarded thereby, and is of lightweight while being readily accessible for inspection, replacement and repair. This clutch means is, therefore, particularly well suited for use with outboard motors. It is to be understood, however, as above noted, that the propeller clutch means of my invention may be applied to propellers of boats in which the propeller shaft is driven by a motor within the hull of the boat. In either case, I provide a comparatively simple mechanism combining in one unit a shear pin, a friction clutch, and a resilient member transmitting rotation of the propeller shaft from the shear pin to the driving member of the friction clutch, with the advantages above noted. Further, since the disk 21 and the cone clutch member 18 may be formed as metal stampings, but little machining is required, particularly if the propeller hub is made as a die casting, in which case practically no machining is necessary; which is advantageous as contributing to low cost of production.

In the modified form of cone clutch unit 26 shown in Figures 6 to 8, inclusive, the cone clutch member 27, formed as a sheet metal stamping, is slotted lengthwise to provide a plurality of resilient fingers 28. Each of the fingers 28 is connected, at its after end, by an arcuate element 29, to an annulus 30 constituting the after end wall of cone clutch member 27 and defining an opening 31 of appreciably greater diameter than propeller shaft 7. The elastic member 20 is bonded, or otherwise fastened, to cone clutch member 27 and to the disc 21, and has a central bore 32 of a diameter to fit snugly about propeller shaft 7, as before. It will be seen that when member 20 is placed under endwise compression, by forcing the propeller hub 10 forwardly along shaft 7 in contact with cone clutch member 27, the fingers 28 are subjected to outward radial pressure effective for holding them in close pressure contact with surface 16 of hub 10. Further, the fingers 28 may be flexed or deformed sufficiently to fit surface 16 accurately, compensating for slight inaccuracies in production. In that manner, I utilize the radial pressure of member 20 to assure accurate and close fit between the cone clutch member 27 and the cooperating surface of the propeller hub 10. It is possible, by forming the hub 10 as a die casting, or accurately machining surface 16 thereof, and by using proper care in forming the cone clutch member 18 of Figure 2, to obtain a sufficiently accurate and close fit of the parts for practical purposes. In such cases I may use the cone clutch unit 17 of Figure 2, but the unit 26 of Figures 6 to 8, inclusive, may be used to advantage in cases where inaccuracies in production are present or may occur.

As above indicated, and as will be understood by those experienced in this field, changes in construction and arrangement of parts of my invention may be resorted to without departing from the field and scope thereof, and I intend to include all such variations, as fall within the scope of the appended claims, in this application in which the preferred forms only of my invention have been disclosed.

I claim:

1. In propeller clutch means of the character described, a propeller shaft, a propeller on the after portion of said shaft comprising a hub having a substantially frusto-conical forwardly flaring uninterrupted interior friction clutch surface, a friction clutch cone cooperating with said surface, means restraining said hub against movement aft along said shaft, and an elastic member fitting the interior of said cone with driving connection thereto, and means cooperating with said first means effective for maintaining said elastic member under substantially constant predetermined endwise pressure and providing positive driving connection between said elastic member and said shaft, said elastic member exerting both axial and radial pressure on said cone normally effective for holding it in clutching engagement with said surface, said hub being otherwise free from said shaft.

2. In propeller clutch means of the character described, a propeller shaft, a propeller on the after portion of said shaft comprising a hub having a substantially frusto-conical forwardly flaring uninterrupted interior friction clutch surface, means for forcing said hub forwardly along said shaft and restraining it against movement aft therealong, a clutch unit comprising a metallic friction clutch cone and a disc disposed forward thereof with an intervening elastic member of rubber-like material fitting within said cone bonded thereto and to said disc, and means providing driving connection between said shaft and said disc and restraining the latter against movement forwardly along said shaft, said elastic member being confined between said disc and cone member under compression normally effective for holding said cone member in clutching engagement with said surface, said hub being otherwise free from said shaft.

3. In propeller clutch means of the character described, a propeller shaft, a propeller on the after portion of said shaft comprising a hub having a substantially frusto-conical forwardly flaring uninterrupted interior friction clutch surface, a radially expandible metallic friction clutch cone cooperating with said surface, means for forcing said hub forwardly along said shaft and restraining it against movement aft therealong, and an elastic member of rubber-like material fitting within said cone under endwise compression bonded thereto and having driving connection to said shaft, said elastic member exerting both axial and radial pressure on said cone normally effective for holding it in clutching engagement with said surface, said hub being otherwise free from said shaft.

4. In propeller clutch means of the character described, a propeller shaft, a propeller on the after portion of said shaft comprising a hub having a substantially frusto-conical forwardly flaring uninterrupted interior friction clutch surface, means for forcing said hub forwardly along said shaft and restraining it against movement aft therealong, a clutch unit comprising a friction clutch cone and a disc disposed forward thereof with an intervening elastic member of rubber-like material fitting within said cone bonded thereto and to said disc, said cone being formed of metal and slotted lengthwise providing a plurality of elements movable radially of said cone by said elastic member, and means providing driving connection between said shaft and said disc and restraining the latter against movement forwardly along said shaft, said elastic member being confined between said disc and cone member under compression normally effective for holding said cone member in clutching engagement with said surface, said hub being otherwise free from said shaft.

5. In propeller clutch means of the character described, a propeller shaft, a propeller on said shaft comprising a metal hub presenting a substantially frusto-conical friction clutch surface, and a clutch unit comprising a substantially frusto-conical elastic member of rubber-like material of a character to tend to bond to metal in contact therewith and a metallic friction clutch cone bonded to said elastic member disposed in cooperating relation to said clutch surface of said hub, and means securing said elastic member at one end thereof to said shaft for rotation therewith, said elastic member being confined under endwise compression between said securing means and said cone member with the latter seating on said hub clutch surface and thereby exerting radial and axial pressure on said clutch cone for maintaining it in effective pressure contact with said hub clutch surface, said hub being otherwise free from said shaft.

6. In propeller clutch means of the character described, a propeller shaft, a propeller on said shaft comprising a metal hub having a substantially frusto-conical forwardly flaring interior friction clutch surface, said hub being restrained against movement aft along said shaft, a clutch unit comprising a substantially frusto-conical elastic member of rubber-like material of a character to tend to bond to metal in contact therewith and a radially expansible metallic friction clutch cone fitting about and bonded to said elastic member, and means securing said elastic member at its forward end to said shaft for rotation therewith, said elastic member being confined under endwise compression between said securing means and said clutch cone with the latter seating on said hub clutch surface, whereby said elastic member exerts axial and radial pressure on said clutch cone for maintaining it in effective pressure contact with said hub clutch surface, said hub being otherwise free from said shaft.

7. In propeller clutch means of the character described, a propeller shaft, a propeller on said shaft comprising a metal hub having a substantially frusto-conical forwardly flaring uninterrupted interior friction clutch surface, said hub being restrained against movement aft along said shaft, a clutch unit comprising a substantially frusto-conical elastic member of rubber-like material of a character to tend to bond to metal in contact therewith and a radially expansible metallic friction clutch cone fitting about and bonded to said elastic member, and means securing said elastic member at its forward end to said shaft for rotation therewith, said elastic member being confined under endwise compression between said securing means and said clutch cone with the latter seating on said hub clutch surface, whereby said elastic member exerts axial and radial pressure on said clutch cone for maintaining it in effective pressure contact with said hub clutch surface, said hub being otherwise free from said shaft.

8. In propeller clutch means of the character described, a propeller shaft, a propeller on said shaft comprising a metal hub having a substantially frusto-conical forwardly flaring uninterrupted interior friction clutch surface, said hub being restrained against movement aft along said shaft, and a clutch unit comprising a metallic friction clutch cone and a disc disposed forward thereof with an intervening elastic member of rubber-like material fitting within said cone bonded thereto and to said disc, the latter having shear driving connection to said shaft and being restrained against forward movement therealong, said elastic member being of a character to tend to bond to metal in contact therewith and being confined under endwise compression between said disc and said cone thereby exerting axial and radial pressure on the latter normally effective for holding it in clutching engagement with said hub clutch surface, said hub being otherwise free from said shaft.

9. In propeller clutch means of the character described, a propeller shaft, a propeller on said shaft comprising a metal hub having a substantially frusto-conical forwardly flaring uninterrupted interior friction clutch surface, a clutch unit comprising a clutch cone in the form of a metal shell fitting in said hub and a disc adjacent the forward end of said cone with an intervening elastic member of rubber-like material fitting within said cone bonded thereto and to said disc, and a shear pin fixed to said shaft having driving connection to said disc, said pin also serving as an abutment restraining said disc against forward movement along said shaft, said elastic member being confined under lengthwise compression between said disc and said cone thereby exerting both axial and radial pressure on said cone normally effective for maintaining it in clutching contact with said hub surface.

10. In propeller clutch means of the character described, a propeller shaft, a propeller on said shaft comprising a metal hub having a substantially frusto-conical forwardly flaring uninterrupted interior friction clutch surface, means for adjusting said hub forwardly along said shaft and restraining it against movement aft therealong, a clutch unit comprising a clutch cone in the form of a metal shell fitting in said hub and a disc adjacent the forward end of said cone with an intervening elastic member of rubber-like material fitting within said cone having driving connection to said disc, said pin also serving as an abutment restraining said disc against forward movement along said shaft, said elastic member being confined under lengthwise compression between said disc and said cone thereby exerting both axial and radial pressure on said cone normally effective for maintaining it in clutching contact with said hub surface.

GEORGE W. MARTIN.

REFERENCES CITED

The following references are of record in the file of this patent:

UNITED STATES PATENTS

| Number | Name | Date |
|---|---|---|
| 514,384 | Sellon | Feb. 6, 1894 |
| 923,043 | Gulick | May 25, 1909 |
| 1,298,395 | Proctor | Mar. 25, 1919 |
| 1,472,077 | Lockwood | Oct. 30, 1923 |
| 1,634,942 | Hillborn | July 5, 1927 |
| 1,860,750 | Riggs | May 31, 1932 |
| 1,931,075 | Johnson | Oct. 17, 1933 |
| 2,032,900 | Alger | Mar. 3, 1936 |
| 2,111,245 | Irgens | Mar. 15, 1938 |
| 2,125,270 | Conover | Aug. 2, 1938 |
| 2,151,724 | Wengel et al. | Mar. 28, 1939 |
| 2,164,485 | Yantis | July 4, 1939 |

FOREIGN PATENTS

| Number | Country | Date |
|---|---|---|
| 25,911 | Great Britain | of 1904 |
| 171,410 | Great Britain | Apr. 6, 1922 |